(12) United States Patent
White

(10) Patent No.: US 7,975,953 B2
(45) Date of Patent: Jul. 12, 2011

(54) STORAGE SYSTEM FOR WASTE MONOFILAMENT FISHING LINE

(76) Inventor: Ian A White, New York, NY (US)

( * ) Notice: Subject to any disclaimer, the term of this patent is extended or adjusted under 35 U.S.C. 154(b) by 0 days.

(21) Appl. No.: 12/443,706

(22) PCT Filed: Aug. 15, 2008

(86) PCT No.: PCT/US2008/073283
§ 371 (c)(1),
(2), (4) Date: Mar. 31, 2009

(87) PCT Pub. No.: WO2009/026136
PCT Pub. Date: Feb. 26, 2009

(65) Prior Publication Data
US 2010/0006691 A1    Jan. 14, 2010

Related U.S. Application Data

(60) Provisional application No. 60/956,218, filed on Aug. 16, 2007.

(51) Int. Cl.
*B65H 65/00* (2006.01)
*A01K 97/06* (2006.01)
*A01K 97/00* (2006.01)
(52) U.S. Cl. ........... 242/476.1; 242/486.9; 242/583; 242/588.2; 242/588.6; 242/601; 242/129

(58) Field of Classification Search ......... 242/396.4, 242/382.5, 383.5, 395.1, 350, 546.1, 564.2, 242/282–284, 395, 397, 398, 402, 405, 405.3, 242/472, 472.5, 476.1, 476.6, 486.9, 487, 242/579, 583, 588, 588.2, 601, 129, 902, 242/588.3, 588.6
See application file for complete search history.

(56) References Cited

U.S. PATENT DOCUMENTS

| | | | |
|---|---|---|---|
| 696,510 A * | 4/1902 | Still | 242/396.4 |
| 6,065,699 A | 5/2000 | Sacconi | |
| 6,435,436 B1 * | 8/2002 | Auten | 242/118.32 |
| 7,018,496 B1 * | 3/2006 | George et al. | 156/152 |
| 2006/0118061 A1 * | 6/2006 | Edwards | 119/795 |
| 2006/0137409 A1 * | 6/2006 | Fawcett et al. | 70/57.1 |
| 2007/0108333 A1 * | 5/2007 | Kuramoto | 242/395 |

FOREIGN PATENT DOCUMENTS

| | | |
|---|---|---|
| JP | 3029019 B2 | 4/2004 |
| KR | 9613027 U | 5/1996 |
| KR | 0203254 Y1 | 11/2000 |

OTHER PUBLICATIONS

Translation of KR9613027.*

* cited by examiner

*Primary Examiner* — William E Dondero
(74) *Attorney, Agent, or Firm* — Brown & Michaels, PC

(57) ABSTRACT

A device for collection and storage of waste monofilament line or similar materials. The device has a rotating spool mechanism in the form of an inner spool with an outer surface to which line adheres rotated by a rotation operator coupled to the spool. An outer cylinder encloses the spool mechanism. Monofilament line is passed through a window in the outer cylinder and adheres to the outer surface of the spool. The rotation operator is rotated, drawing the line into the device for storage and later disposal.

1 Claim, 4 Drawing Sheets

Fig. 1
Fig. 2
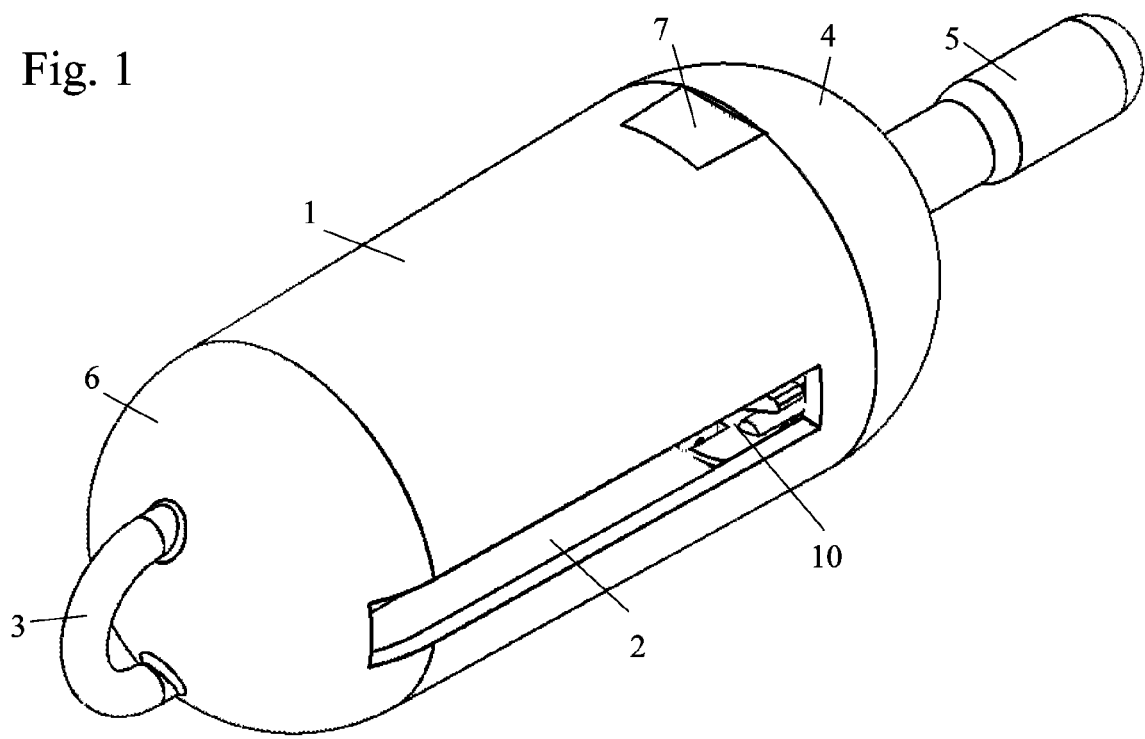
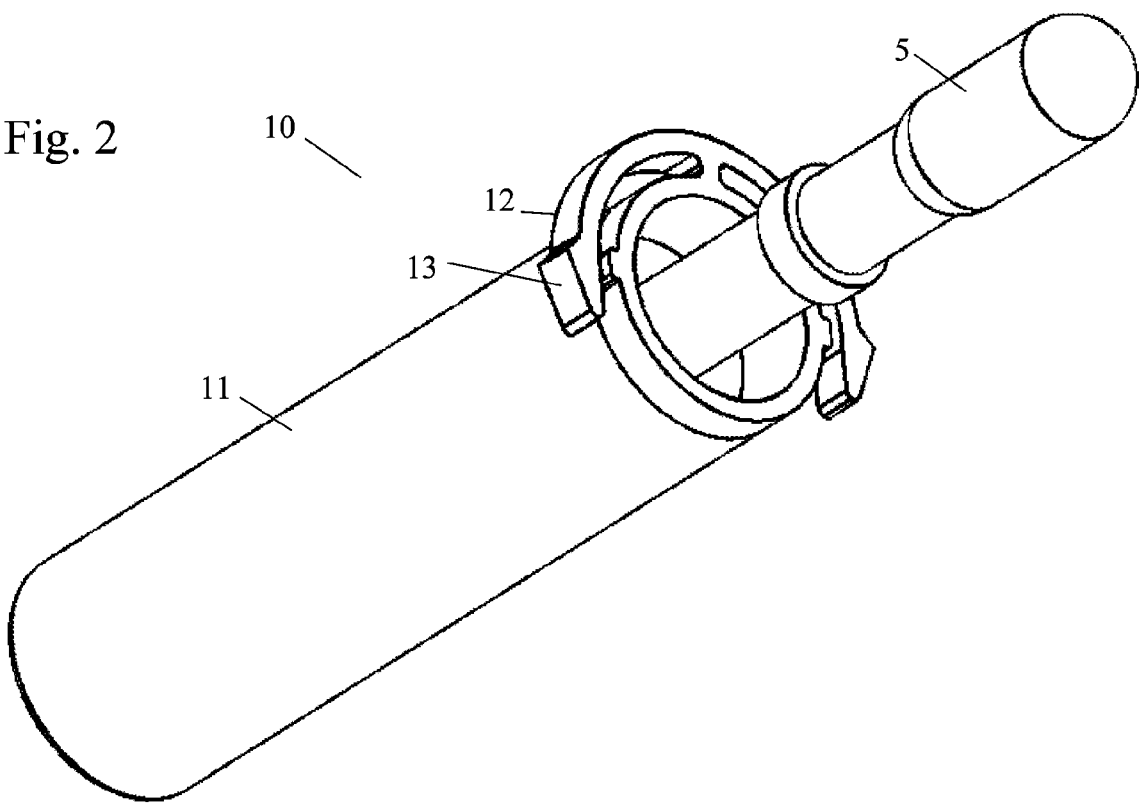

STORAGE SYSTEM FOR WASTE MONOFILAMENT FISHING LINE

REFERENCE TO RELATED APPLICATIONS

This application claims one or more inventions which were disclosed in Provisional Application No. 60/956,218, filed Aug. 16, 2007, entitled "Storage System for Waste Monofilament Fishing Line". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of recreational fishing equipment. More particularly, the invention pertains to a system for the temporary storage of waste monofilament filament fishing line.

2. Description of Related Art

There is a need experienced by fishermen and not addressed by any existing product currently on the market.

While fly fishing there is a constant need to add and remove tippet and leader (monofilament fishing line), which can generate up to 50 meters of waste line per fishermen during a season. Streamside fishing using spin-gear also generates significant monofilament waste. This waste line often ends up being discarded into the environment and accumulating in water systems and riverbanks without degrading for periods well in excess of 600 years.

It's not uncommon for fishermen to change rigs 10 or 20 times during a given day on the water. This can generate around an inch of waste each change. On top of this, adding tippet generates around 2-6 inches and together with unanticipated tangles, many rig set-ups, i.e. tandem-rigs/droppers result in 12-18 inches of line that is not typically reused.

According to the U.S. Fish and Wildlife Service there are over 34 Million recreational fishermen in the U.S. alone. While most are conscientious and make efforts to avoid dropping waste line into the water, line still ends up falling out of pockets and tackle boxes when rummaging for other equipment. This line accumulates on banks and riverbeds and contributes to the aggregation of flotsam, which not only affects local wildlife, but also hampers water management and supply efforts.

The habitat ecology of fish and other wildlife can be seriously and adversely affected by careless or accidental depositing of fishing line in the water or on the bank. Monofilament is particularly resistant to biodegradation and can persist for over 600 years. The newer fluorocarbon fishing line, that is gaining popularity among today's flyfisherman, is reported by manufacturers to be almost totally resistant to decay.

Although there is currently no legislation controlling the disposal of waste monofilament, the U.S. Environmental Protection Agency (EPA) is currently aware of this growing problem. The EPA was responsible in 1994 for proposing a nationwide ban on the use of lead weights for fishing purposes. This led to legislation being passed by several U.S. states restricting lead use and spurred an explosion in the marketing of non-lead alternatives to lead sinkers and jig heads.

Currently there are significant restrictions in Chile for the controlled disposal of waste monofilament by fishermen. Chile is also one of the main non-U.S. destinations for American anglers.

Although these are legitimate reasons for many fishermen to buy a waste monofilament storage device, being conscientious as anglers traditionally are, this does not constitute the primary motivation fishermen will have for purchasing this innovation.

A major problem for most fishermen is the temporary storage of waste line while on the water. Most anglers, when asked in an on-line poll, reported that they are inclined to preserve their recreational environment by preventing personal and avoidable pollution. This means that most of the 34.1 million Americans that fish regularly try to store the waste they generate for transport to an appropriate trash receptacle.

The temporary storage of this line is problematic on multiple levels. First, for the fly fisherman standing within the water system or on the riverbank, there are only two options available when generating waste monofilament. One option is to go against the natural predisposition of most anglers and discard the line into the water or onto the bank. The other option is to attempt to cram monofilament, which can range in length from less than an inch to perhaps a foot or more, into fishing-vest pockets or tackle boxes. As is often the case described by fishermen, this is rather difficult and typically results in the waste line becoming entangled with other tools and equipment stored in fishing vests or tackle boxes.

SUMMARY OF THE INVENTION

The present invention is a device for the collection and storage of waste monofilament line or similar materials. The device has a rotating spool mechanism in the form of an inner spool with an outer surface to which line adheres rotated by a rotation operator coupled to the spool. An outer cylinder encloses the spool mechanism. Monofilament line is passed through a window in the outer cylinder and adheres to the outer surface of the spool. The rotation operator is rotated, drawing the line into the device for storage and later disposal.

The device is designed to efficiently collect and store waste monofilament generated while fishing and reduces frustration associated with tangled waste. In addition to providing a dedicated receptacle that makes handling and storing this waste more practical for the angler, it also provides a significant environmental benefit.

BRIEF DESCRIPTION OF THE DRAWING

FIG. 1 shows a perspective view of the storage device.
FIG. 2 shows the spool component of the invention.

DETAILED DESCRIPTION OF THE INVENTION

Figure 3:
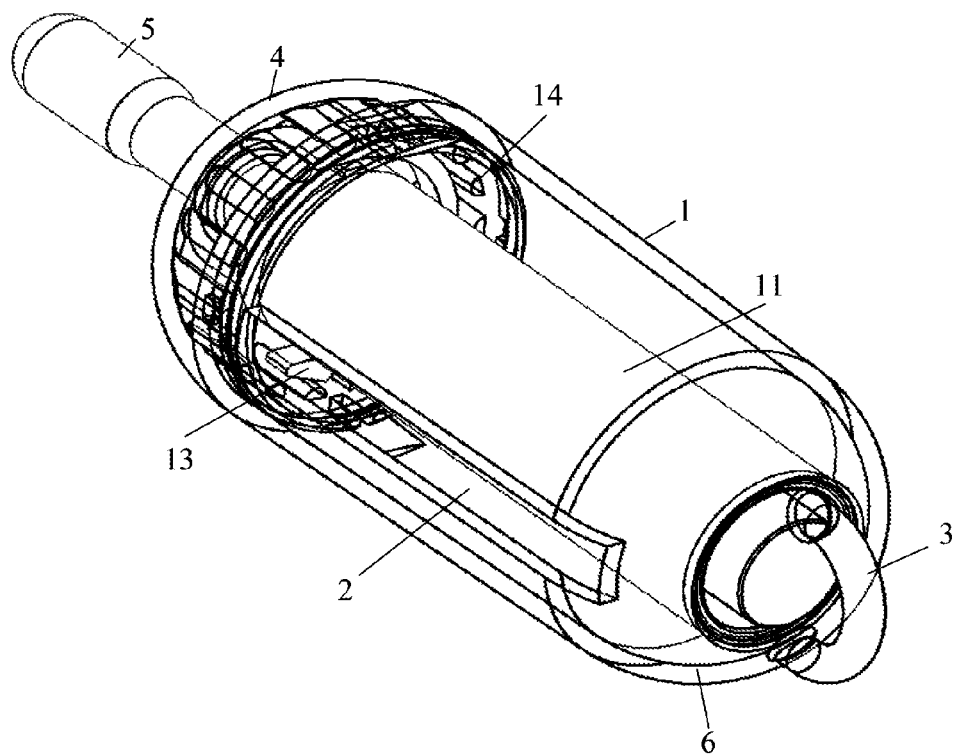
FIG. 3 shows a cut-away perspective view of the storage device.
Figure 4:
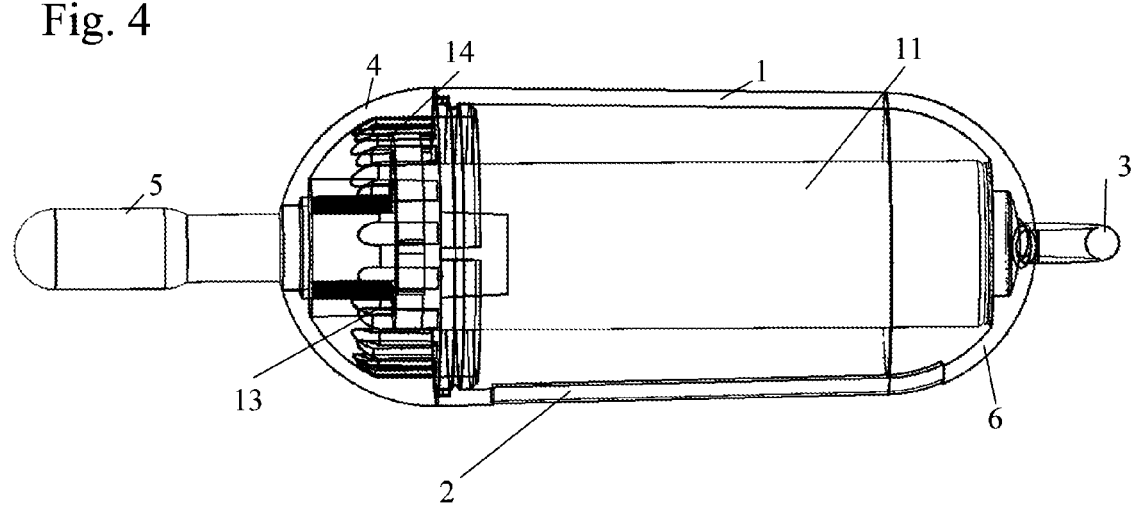
FIG. 4 shows a cut-away side view of the storage device
Figure 5:
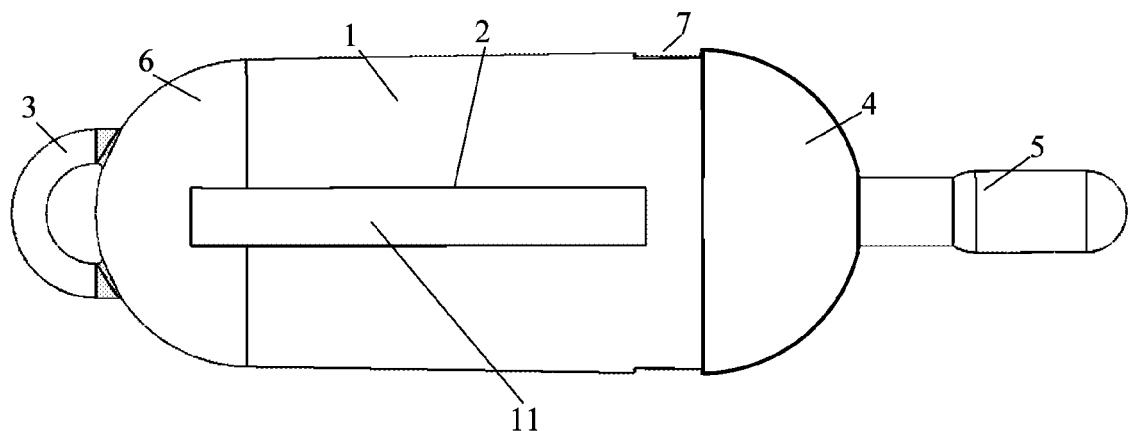
FIG. 5 shows a side view of the storage device with the outer cylinder in place.

As shown in FIGS. 1-5, the invention is a storage device for monofilament fishing line or similar thread-like material. The device collects line on a rotating spool mechanism 10, enclosed by an outer cylinder 1 having a window 2 for insertion of line.

The outer cylinder 1 has first and second end caps closing the outer cylinder 1. One or both end caps are removable by any method desired, such as press-fitting, threading or bayonet connections, to allow access to the inside of the outer cylinder 1 for removal of accumulated line.

In one embodiment of the invention, the first end cap is in the form of a handle cap 4 through which a handle 5 of the spool mechanism 10 protrudes, and the second end cap 6 may include a hook or loop 3 for hanging the device from a vest in a similar fashion to other tools in a fisherman's complement.

Figure 7:
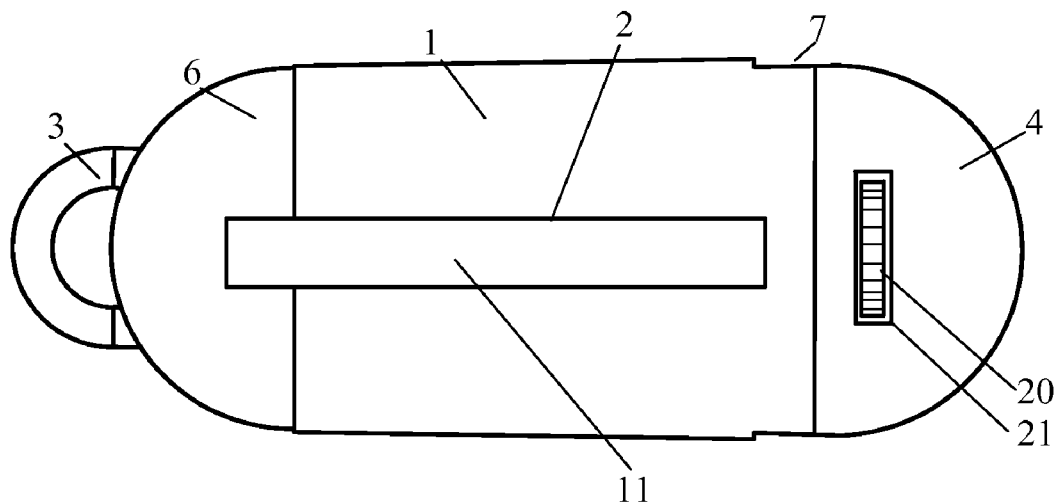
FIG. 7 shows an alternative embodiment of the invention, in which the handle is replaced by a disc.

It will be understood that the handle 5 is shown as an example of a rotation operator—one way of allowing the spool mechanism 10 to be rotated within the outer cylinder 1. Other embodiments for the rotation operator are possible. For example, as shown in FIG. 7, a disc or gear 20 may be mounted so as to protrude through a slot 21 in the outer cylinder 1. The disc 20 is operatively connected to the spool mechanism 10, either frictionally or by mating gear teeth or other ways known to the art, so that rolling the disc 20 rotates the spool mechanism 10.

The second end cap 6 may have an inner bearing for supporting one end of the spool cylinder 11, described below. One or more flats 7 may be provided on the cylinder 1 to facilitate twisting the cylinder 1 relative to the handle cap 4 or second end cap 6, for assembly or disassembly to remove collected line.

Figure 8:
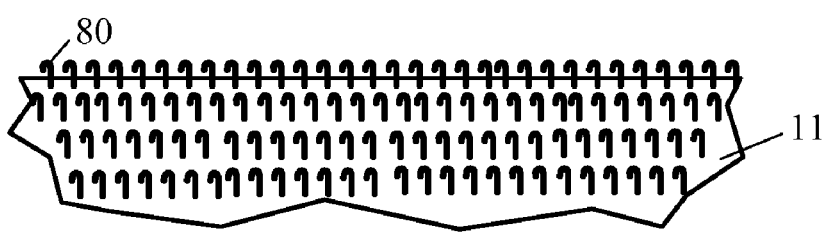
FIG. 8 shows a partial section of the surface of the spool cylinder covered by a plurality of hook elements of a hook and loop fastener.
Figure 9:
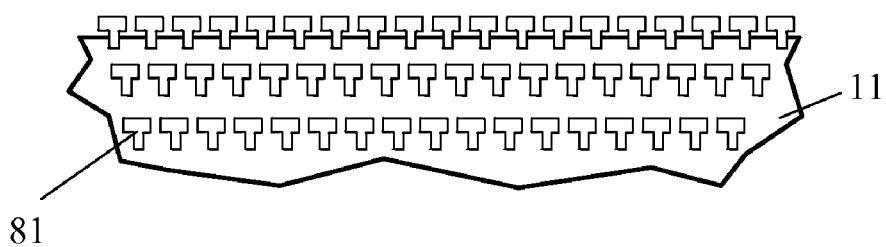
FIG. 9 shows a partial section of the surface of the spool cylinder covered by a plurality of mushroom shaped plastic heads.
Figure 10:
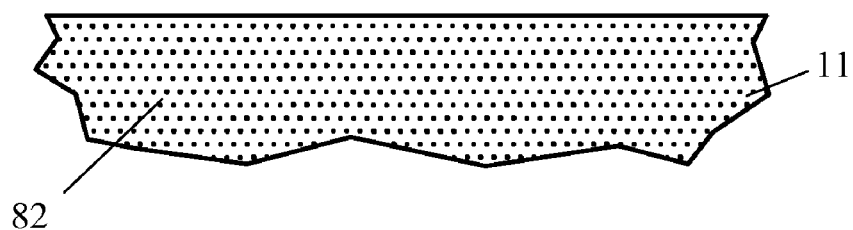
FIG. 10 shows a partial section of the surface of the spool cylinder entirely covered by a non-drying adhesive material.

The spool mechanism 10 comprises a spool cylinder 11, which comprises the part of the mechanism that grips the monofilament and draws it into the device. A rotation operator, such as handle 5, allows the spool cylinder 11 to be rotated by a user. The outer surface of the spool cylinder 11 may be made covered with the hook side 80 of Velcro® hook-and-loop fastener material made by Velcro Industries, or the equivalent made by other manufacturers (please refer to FIG. 8). Other similarly-functioning material, such as, for example, Dual-Lock™ reclosable fastener material produced by 3M, which is a material comprising reclosable adhesive-backed flexible fasteners consisting of continuous plastic strips with fields of mushroom-shaped plastic heads 81 which tightly interlock when pressed together (please refer to FIG. 9), would also be usable in this application. Alternatively, a non-drying adhesive material 82 could be applied to a smooth roll (please refer to FIG. 10), or other methods of providing a surface which would adhere to monofilament line could also be used within the teachings of the invention.

The spool mechanism 10 may optionally have a ratchet 12 having at least one pawl 13 which interfits with a plurality of matching teeth 14 on the inside of the handle cap 4. This feature increases the cylinder's resistance to turning, and thus minimizes any tendency of the spool from rotating when not in use, which might lead to the line unwinding accidentally.

Figure 6:
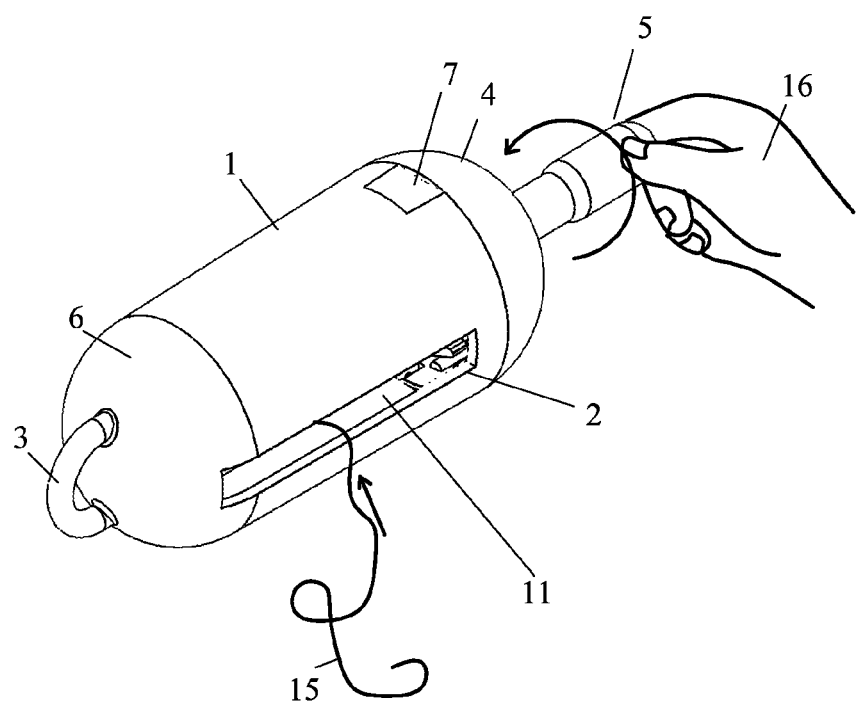
FIG. 6 shows a drawing of the storage device in use.

As shown in FIG. 6, in use, line 15 generated as waste is inserted into the window 2 of the outer cylinder 1. The user 16 twists the handle 5 to rotate the spool cylinder 11, which catches the line 15 on its outer surface, and the line 15 is thus drawn into the inside of the device for storage. In a preferred embodiment, up to 50 meters of line can be stored within the spool before the waste needs to be disposed of.

To dispose of the waste line, the outer cylinder 1 is detached from the handle cap 4 with the use of the flats 7, if present, and the trapped line can be removed from the spool cylinder 11 and discarded. The outer cylinder 1 is then reattached to the handle cap 4 and the device is ready for use once more.

While it will be apparent from the attached figures that a range of materials could be employed to construct the device, an initial review of the product and its intended application indicated that a low cost, UV stabilized material would be preferred and that the material should also be impact and crack resistant. A review of existing and similar "outdoor products" indicated that the majority of these products are comprised of polypropylene. A search of existing commercial grades of polypropylene revealed two primary sources, Exxon Mobil and Basell. A refined search of their offerings led to identification of two suitable materials: Exxon PP1052 and Basell Profax 6323. However, it will be appreciated by one skilled in the art that the exact material chosen is not critical to the invention. While a particular plastic material is preferred at the time of filing, other plastics or materials such as metal could be used within the teachings of the invention.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of collection of a plurality of lengths of waste monofilament fishing line using a storage device for line comprising a rotating spool mechanism comprising a spool cylinder having a radius and an axis and an outer surface having a structure which will adhere to the plurality of lengths of the line and a rotation operator coupled to the spool cylinder, for rotating the cylinder along the axis; and an outer cylinder enclosing the rotating spool mechanism, comprising a cylinder having a radius larger than the radius of the spool cylinder, the cylinder having a window for the passage of line, the method comprising:
   a) passing an end of a length of line to be collected through the window in the outer cylinder;
   b) rotating the rotation operator of the rotating spool mechanism until the end adheres to the structure of the outer surface of the rotating spool mechanism; and
   c) continuing to rotate the rotation operator until the line is taken up within the outer cylinder.

\* \* \* \* \*